Figure 1:
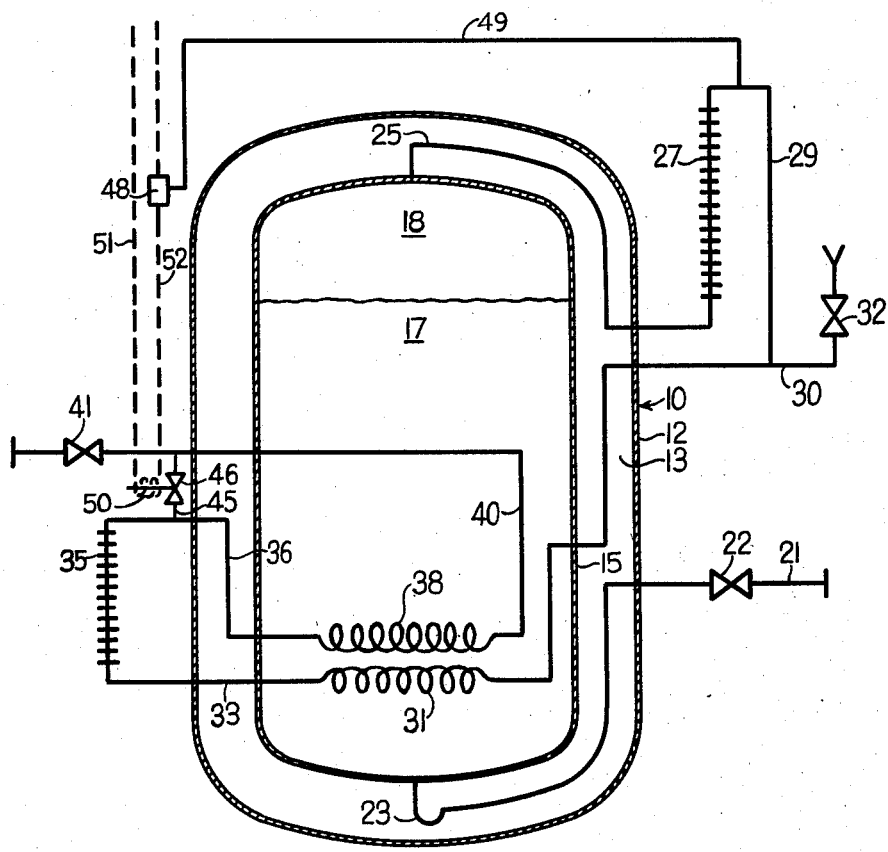

INVENTORS
Herrick L. Johnston.
Charles L. Newton.
BY Schmieding and Fultz
ATTORNEYS _United States Patent Office_

2,842,942
Patented July 15, 1958

2,842,942

APPARATUS FOR DISPENSING GAS FROM A CONTAINER OF LIQUEFIED GAS

Herrick L. Johnston and Charles L. Newton, Columbus, Ohio, assignors to Herrick L. Johnston, Inc., Columbus, Ohio, a corporation of Ohio Application August 25, 1955, Serial No. 530,552

10 Claims. (Cl. 62—50)

This invention relates to the dispensing of gases stored in the liquefied state and having boiling point temperatures materially below 273 degrees Kelvin.

In the use of gaseous products, such as oxygen for hospital applications and the like, it is desirable to store relatively large quantities of the substance in the liquid state in an insulated container, with a quantity of the substance being retained in the gaseous state for withdrawal and use. In the course of dispensing the substance as needed, it is necessary to maintain decreasing quantities in the liquid state and to repeatedly replenish the gaseous phase as it is withdrawn.

It is therefore an object of the present invention to provide method and apparatus for dispensing gas from a container of liquefied gas which apparatus effects, in a novel manner, controlled replacement of the gaseous phase portions as they are withdrawn.

It is another object of the present invention to provide method and apparatus of the type described which utilize heat from the environment to automatically replenish the gaseous phase in the container as portions are withdrawn therefrom, with such function being effected at any practical ambient temperature without the necessity of supplemental heating means.

Further objects and advantages of the present invention will be apparent from the following description, reference being had to the accompanying drawings wherein preferred forms of embodiments of the invention are clearly shown.

Figure 2:
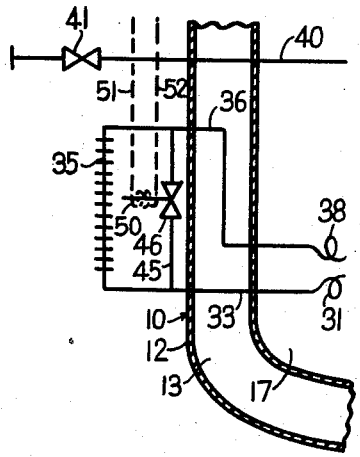

In the drawing:

Figure 1 is a schematic view of a storage means and associated dispensing apparatus arranged according to one aspect of the present invention and adapted for practicing the method thereof; and Figure 2 is a partial schematic view showing a modification of the apparatus of Figure 1.

Referring next to the drawings, the present invention includes an insulated storage means indicated generally at 10. Storage means 10 includes an outer jacket 12 which surrounds an insulating space 13. Insulating space 13 may be in the form of a vacuum chamber or in the form of a vacuum chamber containing insulating material such as fine particles of low conductivity and high reflectivity. A vacuum can be maintained in the insulating space 13 by connecting such space with a source of vacuum not illustrated.

The storage means 10 further includes an inner shell 15 provided for directly containing a quantity of liquefied gas 17 with a gaseous portion of the substance being contained in the chamber 18 above the liquid.

The storage means 10 is provided with a liquid fill line 21 and a liquid fill valve 22. A liquid trap 23 is located in line 21 beneath the inner shell 15 in the manner illustrated.

A gas withdrawal line 25 connects chamber 18 with the cold end of the primary external heat exchanger 27. The gas being withdrawn is first passed through a primary external exchanger 27 in heat exchange with the environment at the existing ambient temperature. The gas then passes through a line 29 to a primary internal heat exchanger 31 wherein the warmed gas gives up heat, picked up from the environment, to the liquid phase 17. The heat given up at the primary internal exchanger 31 to the liquefied gas 17 causes vaporization of a portion of such liquefied gas to replenish a portion of the quantity of gaseous phase being withdrawn. The withdrawal product next leaves the cold end of primary internal exchanger 31 and passes through a secondary external heat exchanger 35 wherein the withdrawal product is again warmed by heat exchange with the environment at the existing ambient temperature.

The withdrawal product leaving the warm end of secondary external heat exchanger 35 passes through a line 36 to a secondary internal heat exchanger 38 wherein the withdrawal product again gives up heat, picked up from the environment, to the liquefied gas 17.

The withdrawal product next leaves the cold end of secondary internal heat exchanger 38 and passes through a line 40, a dispensing valve 41, and thence to the destination of use.

To provide means for venting the container, a line 30 is connected to the line 29, leading from the warm end of primary exchanger 27, and provided with a manual vent valve 32.

Since, according to the present invention, only heat from the environment is utilized to warm the gas being withdrawn, and hence to vaporize liquefied gas, and since practical ambient temperatures, such as 78 degrees F. and below, are to be utilized, then two external heat exchangers 27 and 35 and two internal heat exchangers 31 and 38 are utilized to provide such advantages of the present invention. The reason for utilizing two external heat exchange passes and two internal heat exchange passes can best be understood by considering the following calculations which show that an impractically high ambient temperature of 119 degrees F. would be required if only one external heat exchange pass and one internal heat exchange pass were utilized.

It will be understood that the heat input from the environment to the gas being withdrawn must be greater than the heat input required to vaporize liquid. This holds true because of the temperature differences of a liquid-immersed internal exchanger and an external exchanger exposed to the environment, at the cold and warm ends respectively. Within the limits of practical heat exchanger design, the temperature differences would be 5 to 10 degrees F. for the two exchanges. If a 5 degree F. temperature difference is assumed, then the following holds true:

$$W=\frac{Q_1}{C_p(t_2-t_1)}=\frac{Q_1}{(h_1-h_2)}=\frac{Q_2}{C_p(t_1-T_2)}=\frac{Q_2}{(h_1-H_2)}=\frac{Q_1}{L}$$

$$t_1=T_1-5$$
$$t_2=T_2+5$$

Therefore
$$L=h_1-h_2$$

where
$w$=liquid vaporized, lb./hr.
$Q_1$=heat transferred at liquid-immersed coil, B. t. u./hr.
$Q_2$=heat transferred at outside coil, B. t. u./hr.
$C_p$=specific heat of gas
$t_2$=temperature of gas from immersed coil, ° F.
$t_1$=temperature of gas from outside coil, ° F.
$T_1$=ambient temperature, ° F.
$T_2$=liquid temperature, ° F.
$h_1$=enthalpy of gas from outside coil, B. t. u./lb.
$h_2$=enthalpy of gas from immersed coil, B. t. u./lb.
$H_2$=enthalpy of gas to outside coil, B. t. u./lb.
$L$=heat of vaporization of liquid, B. t. u./lb.

Assuming a Dewar pressure constant at 20 p. s. i. a., then the value of the ambient temperature is calculated as follows:

At 20 p. s. i. a. liquid oxygen temperature at saturation equals $-291.8°$ F.

$T_2 = -291.8°$ F.
$t_2 = -286.8°$ F.
$H_2 = 34.7$ B. t. u./lb.
$h_2 = 36.0$ B. t. u./lb.
$L = 34.7 + 55.15 = 89.85$ B. t. u./lb.
$h_1 = h_2 + L = 89.85 + 36.0 = 125.85$
$t_1 = 119°$ F.

Hence it is seen that if only one external heat exchange pass and only one internal heat exchange pass were employed, the ambient temperature required to effect the desired result would be 119 degrees F. for the assumed conditions or the pressure in the container would not remain constant. At a higher container pressure, such as 100 p. s. i. a. equilibrium pressure, the ambient temperature required would be at least 95 degrees F., which temperature would still be above the practical range for many applications.

According to the present invention, the need for an impractically high ambient temperature is eliminated by use of a secondary external heat exchange pass and a secondary internal heat exchange pass whereby, it will be understood, the product being withdrawn gives up heat to the stored liquid, in two stages, to supply the necessary quantity of heat for effecting the desired results.

In instances where constant ambient temperatures are present, the physical characteristics of the external heat exchangers 27 and 35 and the physical characteristics of the internal heat exchangers 31 and 38 can be determined and provided to effect the appropriate amount of heat input from the environment to the liquefied gas to replenish chamber 18 with the required quantity of gaseous phase corresponding to the quantity withdrawn.

As an aspect to the present invention, a control system may be provided to adapt the present method and apparatus for precise controlled functioning at various practical ambient temperatures. A suitable control system is illustrated in the drawing. Such control system includes a by-pass line 45 provided with a solenoid operated valve 46, with such by-pass line being connected between the line 36, leading from the warm end of one of the external heat exchangers 35, and the line 40, leading from the cold end of internal heat exchanger 38. A suitable pressure responsive control 48 communicates with the gas being withdrawn by means of a line 49 whereby such pressure responsive control is responsively subjected to pressure variations of the gaseous phase being withdrawn. Pressure responsive control 48 may include a pressure actuated switch in circuit with a solenoid 50 for actuating by-pass valve 46. Wires 51 and 52 connect the valve and switch with a source of electric current.

It will therefore be understood that with a control system, of the type illustrated in the drawing, the pressure responsive control 48 functions not only as a pressure sensing means, but also as a transducer for transducing the sensed pressure signal into an electro-mechanical response for controlling the flow of withdrawal product through the by-pass line 45.

In operation of the control apparatus of Figure 1, when the pressure responsive controls 48 senses a drop in pressure of the gas being withdrawn, the by-pass valve 46 is closed or throttled to increase the proportion of the total flow passing through the secondary internal heat exchanger 38. As a result, more heat is given up to the liquefied gas at secondary internal exchanger 38. This produces an increase in evaporation of liquefied gas to produce more gaseous phase in chamber 18 with a corresponding build-up in pressure. When the pressure in chamber 18 increases to a predetermined desired value, pressure responsive control 48 senses same and an appropriate adjustment is automatically effected at by-pass valve 46.

The aspect of Figure 2 differs from that of Figure 1 in that the by-pass line 45 is connected between lines 33 and 36 leading to and from the cold and warm ends, respectively, of secondary external exchanger 35.

In operation of the control apparatus of Figure 2, when the pressure responsive control 48 senses a drop in pressure of the gas being withdrawn, the by-pass valve 46 is closed or throttled to increase the quantity of flow passing through the secondary external heat exchanger 35. As a result, more heat is picked up from the environment and, hence, more heat is given up to the liquefied gas at secondary internal exchanger 38. This results in an increase in evaporation of liquefied gas to produce more gaseous phase in chamber 18 with a corresponding build-up in pressure. When the pressure in chamber 18 increases to a predetermined desired value, the pressure responsive control 48 senses same and an appropriate adjustment is automatically effected at by-pass valve 46.

While the forms of embodiments of the present invention as herein disclosed constitute preferred forms, it is to be understood that other forms might be adopted, all coming within the scope of the claims which follow:

We claim:

1. An apparatus for dispensing gas from a container of liquefied gas comprising, in combination, an insulated container means for confining a liquefied gas and a gaseous phase of said liquefied gas above the liquid; heat exchange means for passing gas withdrawn from said container through at least two heat exchange passes with the environmental air at ambient temperature, said heat exchange means including an intake passage communicating with said gas space whereby said heat exchange means receives a flow of said gaseous phase; heat exchange means for passing said withdrawn portion through at least two heat exchange passes with the liquefied gas in said container whereby heat picked up from said environmental air is given up to said liquefied gas to vaporize a portion thereof at least equal in amount to said portion withdrawn, one of said heat exchange passes with the liquefied gas being subsequent to one but prior to another of said environmental heat exchange passes, and another of said heat exchange passes with the liquefied gas being subsequent to said another environmental heat exchange pass; means for varying the heat exchange effect at one of said heat exchange means, and control means operatively connected to said means for varying the heat exchange effect and responsive to variations in the pressure of said gas.

2. An apparatus for dispensing gas from a container of liquefied gas comprising, in combination, an insulated container means for confining a liquefied gas and a gaseous phase of said liquefied gas above the liquid; heat exchange means for passing gas withdrawn from said container through at least two heat exchange passes with the environmental air at ambient temperature, said heat exchange means including an intake passage communicating with said gas space whereby said heat exchange means receives a flow of said gaseous phase; heat exchange means for passing said withdrawn portion through at least two heat exchange passes with the liquefied gas in said container whereby heat picked up from said environmental air is given up to said liquefied gas to vaporize a portion thereof at least equal in amount to said portion withdrawn, one of said heat exchange passes with the liquefied gas being subsequent to one but prior to another of said environmental heat exchange passes, and another of said heat exchange passes with the liquefied gas being subsequent to said another environmental heat exchange pass, a by-pass conduit connected to by-pass part of said withdrawn portion around at least one of said heat exchange means; and control means operatively effective at said by-pass and responsive to variations in the pressure of said gas.

3. An apparatus for dispensing gas from a container of liquefied gas comprising, in combination, an insulated container means for confining a liquefied gas with a gas space above the liquid, said gas space containing a gaseous phase of said liquid; a first heat exchanger in heat exchange relationship with the air of the environment; conduit means connecting said gas space with said first heat exchanger for delivering a flow of said gaseous phase to said first heat exchanger; a second heat exchanger in contact with said liquefied gas in said container; a second conduit means connecting said first heat exchanger with said second heat exchanger; a third heat exchanger in heat exchange relationship with the air of the environment; a third conduit means connecting said second heat exchanger with said third heat exchanger; a fourth heat exchanger in contact with said liquefied gas within said container; a fourth conduit means connecting said third heat exchanger with said fourth heat exchanger; and a fifth conduit means connected with said fourth heat exchanger and leading to a destination for said gas being dispensed.

4. An apparatus for dispensing gas from a container of liquefied gas comprising, in combination, an insulated container means for confining a liquefied gas with a gas space above the liquid, said gas space containing a gaseous phase of said liquid; a first heat exchanger in heat exchange relationship with the air of the environment; conduit means connecting said gas space with said first heat exchanger for delivering a flow of said gaseous phase to said first heat exchanger; a second heat exchanger in contact with said liquefied gas in said container; a second conduit means connecting said first heat exchanger with said second heat exchanger; a third heat exchanger in heat exchange relationship with the air of the environment; a third conduit means connecting said second heat exchanger with said third heat exchanger; a fourth heat exchanger in contact with said liquefied gas within said container; a fourth conduit means connecting said third heat exchanger with said fourth heat exchanger; a fifth conduit means connected with said fourth heat exchanger and leading to a destination for said gas being dispensed; and means for varying the heat exchange effect at one of said heat exchangers.

5. An apparatus for dispensing gas from a container of liquefied gas comprising, in combination, an insulated container means for confining a liquefied gas with a gas space above the liquid, said gas space containing a gaseous phase of said liquid; a first heat exchanger in heat exchange relationship with the air of the environment; conduit means connecting said gas space with said first heat exchanger for delivering a flow of said gaseous phase to said first heat exchanger; a second heat exchanger in contact with said liquefied gas in said container; a second conduit means connecting said first heat exchanger with said second heat exchanger; a third heat exchanger in heat exchange relationship with the air of environment; a third conduit means connecting said second heat exchanger with said third heat exchanger; a fourth heat exchanger in contact with said liquefied gas within said container; a fourth conduit means connecting said third heat exchanger with said fourth heat exchanger; a fifth conduit means connected with said fourth heat exchanger and leading to a destination for said gas being dispensed; means for varying the heat exchange effect at one of said heat exchangers; and control means responsive to variations in the pressure of said gas and operatively connected with said means for varying the heat exchange effect at said one heat exchanger.

6. An apparatus for dispensing gas from a container of liquefied gas comprising, in combination, an insulated container means for confining a liquefied gas with a gas space above the liquid, said gas space containing a gaseous phase of said liquid; a first heat exchanger in heat exchange relationship with the air of the environment; conduit means connecting said gas space with said first heat exchanger for delivering a flow of said gaseous phase to said first heat exchanger; a second heat exchanger in contact with said liquefied gas in said container; a second conduit means connecting said first heat exchanger with said second heat exchanger; a third heat exchanger in heat exchange relationship with the air of the environment; a third conduit means connecting said second heat exchanger with said third heat exchanger; a fourth heat exchanger in contact with said liquefied gas within said container; a fourth conduit means connecting said third heat exchanger with said fourth heat exchanger; a fifth conduit means connected with said fourth heat exchanger and leading to a destination for said gas being dispensed; a by-pass conduit connected between the conduit means entering and leaving certain of said third and fourth heat exchangers; and valve means for controlling the flow through said by-pass conduit.

7. An apparatus for dispensing gas from a container of liquefied gas comprising, in combination, an insulated container means for confining a liquefied gas with a gas space above the liquid, said gas space containing a gaseous phase of said liquid; a first heat exchanger in heat exchange relationship with the air of the environment; conduit means connecting said gas space with said first heat exchanger for delivering a flow of said gaseous phase to said first heat exchanger; a second heat exchanger in contact with said liquefied gas in said container; a second conduit means connecting said first heat exchanger with said second heat exchanger; a third heat exchanger in heat exchange relationship with the air of the environment; a third conduit means connecting said second heat exchanger with said third heat exchanger; a fourth heat exchanger in contact with said liquefied gas within said container; a fourth conduit means connecting said third heat exchanger with said fourth heat exchanger; a fifth conduit means connected with said fourth heat exchanger and leading to a destination for said gas being dispensed; a by-pass conduit connected between the conduit means entering and leaving certain of said third and fourth heat exchangers; valve means for controlling the flow through said by-pass conduit; and control means responsive to variations in the pressure of said gas and operatively connected with said valve means.

8. The method of storing and dispensing a gas from a container of liquefied gas which method comprises storing the liquefied gas in a container which includes a gaseous phase of said liquefied gas; withdrawing a portion from said gaseous phase; passing said gaseous phase portion in heat exchange with the environmental air at ambient temperature to warm said portion; passing said portion in heat exchange relationship with said liquefied gas in said container to vaporize liquid into said gaseous phase to replenish same; again passing said portion in heat exchange with said environmental air; again passing said portion in heat exchange with said liquefied gas; and controlling the magnitude of heat exchange effect at at least one of said heat exchange passes to replenish said gaseous phase in proportion to the quantity of said portion withdrawn.

9. The method of storing and dispensing a gas from a container of liquefied gas which method comprises storing the liquefied gas in a container which includes a gaseous phase of said liquefied gas; withdrawing a portion from said gaseous phase; passing said gaseous phase portion in heat exchange with the environmental air at ambient temperature to warm said portion; passing said portion in heat exchange relationship with said liquefied gas in said container to vaporize liquid into said gaseous phase to replenish same; again passing said portion in heat exchange with said environmental air; again passing said portion in heat exchange with said liquefied gas;

and automatically varying the magnitude of heat exchange effect at at least one of said heat exchange passes responsive to variations in the pressure of said gas.

10. The method of storing and dispensing a gas from a container of liquefied gas which method comprises storing the liquefied gas in a container which includes a gaseous phase of said liquefied gas; withdrawing a portion from said gaseous phase; passing said gaseous phase portion in heat exchange with the environmental air at ambient temperature to warm said portion; passing said portion in heat exchange relationship with said liquefied gas in said container to vaporize liquid into said gaseous phase to replenish same; again passing said portion in heat exchange with said environmental air; again passing said portion in heat exchange with said liquefied gas; by-passing part of said portion around at least one of said heat exchange passes; and automatically controlling the quantity of said portion passed through said by-pass responsive to variations in the pressure of said gaseous phase.

References Cited in the file of this patent

UNITED STATES PATENTS

| 1,942,944 | Smith | Jan. 9, 1934 |
| 2,072,713 | Folmsbee et al. | Mar. 2, 1937 |

FOREIGN PATENTS

| 297,384 | Great Britain | Nov. 14, 1929 |